United States Patent [19]
Bompard et al.

[11] 4,394,203
[45] * Jul. 19, 1983

[54] PROCESS FOR MANUFACTURE OF THREE-DIMENSIONAL ROTATIONAL PARTS AND MACHINE FOR THE IMPLEMENTATION OF SUCH PROCESS

[75] Inventors: Bruno Bompard; Alain Bruyere, both of Lyons, France

[73] Assignees: Commissariat a l'Energie Atomique; Societe Brochier et Fils, both of Paris, France

[*] Notice: The portion of the term of this patent subsequent to Oct. 19, 1999, has been disclaimed.

[21] Appl. No.: 276,536

[22] Filed: Jun. 23, 1981

[30] Foreign Application Priority Data

Jul. 1, 1980 [FR] France .................................. 80 14640

[51] Int. Cl.³ ............................................ B65H 81/00
[52] U.S. Cl. .................................... 156/175; 156/425; 156/433; 242/7.21
[58] Field of Search ............... 156/169, 172, 173, 175, 156/425, 161, 165, 440, 162; 242/7.02, 7.21, 7.22

[56] References Cited

U.S. PATENT DOCUMENTS

4,080,915  3/1978  Bompard et al. .................. 242/7.21

*Primary Examiner*—Michael W. Ball
*Attorney, Agent, or Firm*—Kerkam, Stowell, Kondracki and Clarke

[57] ABSTRACT

A machine for the manufacture of rotational parts in a three-dimensional material is disclosed. A mandrel provided with rows of barbs is rotatably carried by the machine, whereby superimposed layers of threads are successively deposited in the longitudinal and circumferential corridors defined between the barbs. The machine additionally comprises a retractable member adapted to hold in place one extremity of a weft thread when the latter does not extend outside of the corresponding corridor, and a winding system which positions a holding thread in a circumferential corridor near the extremities of the weft threads to hold them in place when the retractable member has been retracted.

14 Claims, 7 Drawing Figures

PROCESS FOR MANUFACTURE OF THREE-DIMENSIONAL ROTATIONAL PARTS AND MACHINE FOR THE IMPLEMENTATION OF SUCH PROCESS

This invention, which is the result of collaboration between the Commissariat à l'Energie Atomique and Messrs. Bruno Bompard and Alain Bruyère of the J. Brochier et Fils Company, relates to a process for the manufacture of rotational bodies or parts made of a three-dimensional material, as well as to a machine with which it is possible to implement this process industrially.

More particularly, the invention relates to an improvement in the manufacturing process described and claimed in French Pat. No. 2 408 676 filed on Sept. 23, 1977, on behalf of the Commissariat à l'Energie Atomique. The process described in this patent application makes it possible to produce bodies or parts having any geometric form whatsoever in a three-dimensional material embedded in a resin, such material being capable of having a considerable thickness. The material making up the part thus produced comprises three series of threads arranged in three preferred directions, possibly perpendicular, and the density of the threads in each of the three directions can be as high as may be desired.

It should be pointed out that the term "threads" used in this application designates not only a thread but equally a filament, a fiber, or even a strand of threads or filaments or fibers, and that the material constituting such thread may be any of graphite, carbon, glass, silica, polyamide, polyimide, etc.

The process described in French Pat. No. 2 408 676 consists in making a supporting mandrel from a material suitable for accomodating barbs implanted directly by pressure; in implanting on suche mandrel rows of barbs made of a filiform textile material that has been previously rigidified by impregnation with a hardenable resin, in such a way that longitudinal and circumferential corridors are delimited between the barbs; in placing sheets of superimposed threads in the corridors thus defined, by winding and by weaving; in densifying the assembly thus obtained; and finally, in eliminating the supporting mandrel.

More specifically, French Pat. No. 2 408 676 describes a process and a machine whereby it is possible to implant the barbs on the surface of the mandrel. The operation of winding and weaving the threads in the corridors defined between the barbs are subsequently effected by means of a machine such as the one which is described in French Pat. No. 2 315 562, the application for which was filed on June 26, 1975, on behalf of the Commissariat à l'Energie Atomique.

In comparison with the other known processes of the prior art, the process described in French Pat. No. 2 408 676 offers the advantage that it makes it possible to use threads preimpregnated with resin, which ensures a better distribution of the resin in the core of the formed part or piece. What is more, with this process it is possible to obtain, easily and at a relatively low cost, parts or pieces made of three-dimensional material in which the thread density in each of the three directions can be as high as desired.

For certain special manufactures it may be necessary to have the number of longitudinal threads contained in the weaving corridors and also the number of circumferential threads contained in the winding corridors vary from one end of the part to the other. This is the case, in particular, when it is desired that an appreciably uniform thread density be maintained throughout a part whose diameter is not constant. Modulation of the number of threads is similarly necessary in the converse hypothesis, i.e., when manufacturing a part which may or may not have a constant diameter and on which the density has to vary according to a given law from one extremity of such part to the other.

In French Pat. No. 2 315 562 it was proposed that certain of the weft threads be placed on only part of the length of the mandrel by being hooked onto barbs placed for this purpose on the mandrel during the manufacture of the mandrel. However, the method described in this document consists in superimposing layers of longitudinal and circumferential threads on a smooth mandrel and then sewing the stack thus produced in a third direction in order to manufacture a three-dimensional rotational part. The barbs on which some of the weft threads are hooked are thus sufficiently spaced in order to allow the weaving heddle to pass from one longitudinal corridor to another without having to go beyond the extremity of the mandrel. However, when the third thread direction is obtained by forming barbs on the mandrel before the winding and the weaving are done, as disclosed by French Pat. No. 2 408 676, and as required by this invention, this approach can no longer be considered. Indeed, the length of the weaving heddle is generally such that it cannot move circumferentially between the barbs. Furthermore, the solution described in French Pat. No. 2 315 562 assumes that the course travelled by the weaving carriage varies according to the weaving corridor opposite which the heddle is located, which is virtually impossible to achieve on an automatic machine.

This invention relates to a process for the manufacture of three-dimensional rotational pieces which constitutes an improvement over the process described and claimed in French Pat. No. 2 408 676 and makes it possible, in particular, automatically and simply to produce rotational parts in which the number of weft threads is not constant from one extremity of the part to the other.

Such a process can be applied in particular to the manufacture of electrical insulator parts made of resin and silica fibers, and parts of electrical sectionalizer switches for very-high-intensity currents, made of fiberglass. It can also be employed in the automobile and aeronautic industries, in particular for the manufacture of brake and clutch components and for making the walls of combustion chambers and pistons for motor vehicles.

For this purpose, and in accordance with the invention, a process is proposed for the manufacture of rotational parts made from a three-dimensional material, consisting in the fabrication of a supporting mandrel provided with rows of barbs which define between them longitudinal corridors and circumferential corridors, in placing sheets of superimposed threads in the said corridors by weaving and by winding ; in densifying the assembly thus obtained ; and finally in eliminating the supporting mandrel; the said process being characterized in that certain of the weft threads are placed in only a portion of the length of the corresponding longitudinal corridors and in that the extremity or extremities of such threads which do not extend out of the corresponding corridors are held in place by winding at least one holding thread in one or more circumferential corridors near such extremity.

Although the invention is particularly suited for the manufacture of three-dimensional parts from a mandrel on which barbs have been implanted by pressing, as disclosed in French Pat. No. 2 408 676, it also applies to the case in which the barbs are made directly on the mandrel by machining. However, the later technique presents various drawbacks, such as the cost and the time required for machining, the limitation that it involves in the density of the barbs, and the risks of delamination that it entails. As a result, the choice will preferably fall upon the technique of implantation of the barbs by pressure within the framework of this invention.

According to a preferred manner of embodiment of the invention, the extremity of the weft thread that does not extend beyond the corresponding longitudinal corridor is temporarily held in place by means of a first retractable member before the holding thread is wound on. In this case, the weft thread can be brough back into the said longitudinal corridor over the first retractable member, and then the said extremity of the weft thread can be held inwards of the first retractable member by means of a second retractable member and the first retractable member can be withdrawn in a direction appreciably tangential to the mandrel, and finally the holding thread can be wound on. It is preferable to cause the mandrel to rotate a number of degrees corresponding to the distance separating two successive longitudinal corridors at the same time that the first retractable member is withdrawn and that the second retractable member shifts tangentially in the same direction and over a distance that is appreciably the same.

In accordance with a secondary feature of the invention, it is likewise possible to cause the number of winding threads of a given layer to vary according to the corridors in which they are placed.

In accordance with still another secondary characteristic of the invention, the weft and winding threads are directly placed in the corresponding corridors. This placing is preferably effected at the top portion of the mandrel and appreciably in the vertical plane passing through the center-line of the mandrel. In the event that certain of the longitudinal rows of barbs do not extend throughout the entire length of the mandrel and define discontinuities in the widths of the longitudinal corridors, one can then place the weft threads by moving them laterally with respect to the vertical plane in the proximity of at least some of the discontinuities, so as to center these threads with respect to the corresponding corridors.

The invention also relates to a machine for the manufacture of rotational parts make from three-dimensional material in which some of the weft threads do not extend over the entire length of the longitudinal corridors.

More specifically, the invention relates to a machine comprising means for supporting, in a rotating arrangement, a mandrel provided with rows of barbs defining between them longitudinal corridors and circumferential corridors, weaving means and winding means suitable for placing superimposed layers of threads in the said corridors. In accordance with the invention, such machine is characterized in that it further comprises at least a first retractable member to hold an extremity of a weft thread when such thread does not extend out of the corresponding corridor, and a winding system placing at least one holding thread in at least one of the circumferential corridors adjacent to the said extremity of the weft thread, so as to hold the corresponding extremities of the weft threads previously positioned by the weaving means in the other longitudinal corridors.

In accordance with another characteristic of the invention, the machine further comprises a second retractable member which is recessed in position with respect to the first retractable member, considering the said extremity of the weft thread. The weaving means can then comprise at least one heddle guided so as to move along a generatrix of the mandrel within a longitudinal corridor, with means being provided for causing the mandrel to revolve in a given direction and in a discontinuous manner in accordance with a pitch equal to the distance between two neighbouring longitudinal corridors each time that the heddle reaches one of the extremities of the mandrel, each of the retractable members being movable radially with respect to the mandrel so as to enable the heddle to pass and tangentially so as to accompany the mandrel in its rotation end, for the first member, to enable it to be freed with respect to the weft thread. Preferably, the winding system comprises a thread feeding system and a thread guiding system positioned tangentially recessed with respect to the longitudinal corridor in which the heddle moves and in a circumferential corridor located between those into which the retractable members are received. The thread guiding system can then be borne by a supporting assembly associated with a fixed part of the machine, with this assembly likewise carrying the retractable members by means of devices for displacing these members radially and tangentially with respect to the mandrel.

We shall now, by way of example and without limitation, describe a particular embodiment of the invention, referring to the attached drawings, in which:

FIG. 3 is a top view of the system illustrated in FIG. 2, and FIGS. 4a, 4b, 4c and 4d show schematically the different stages of operation of the holding device illustrated in FIGS. 2 and 3 during weaving.

Figure 1:
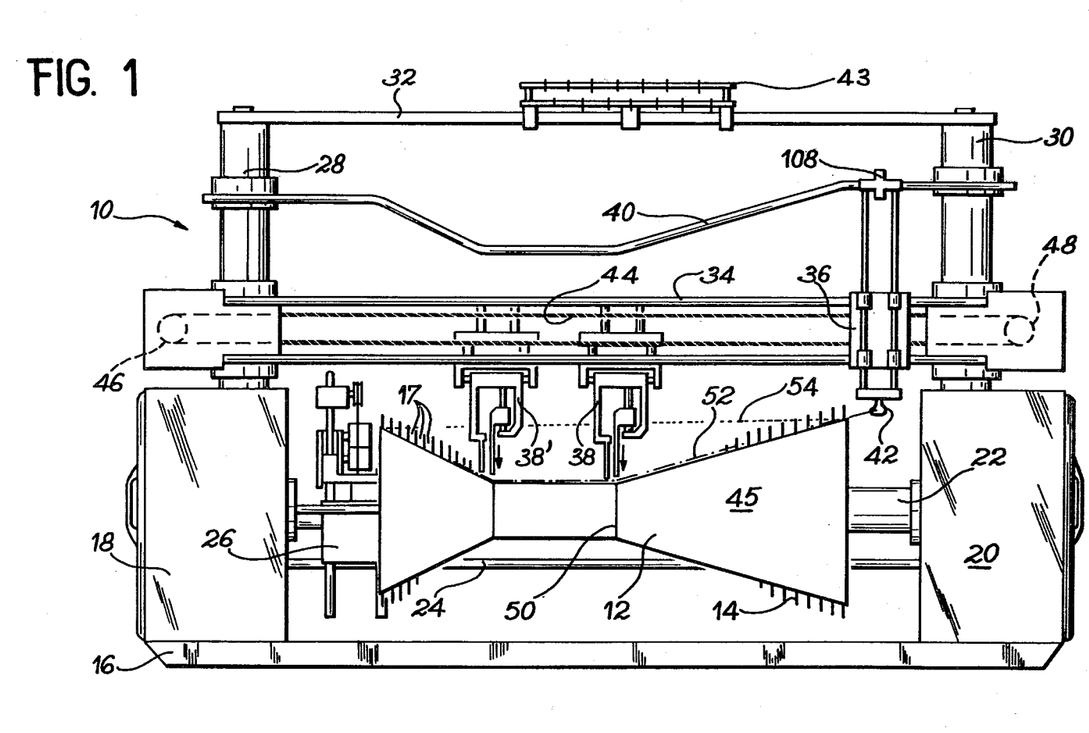
FIG. 1 is a front view of a machine designed for effecting the winding and weaving of superimposed layers of threads in corridors defined by barbs borne by a mandrel, this machine being made in accordance with the teachings of this invention.

The machine 10 shown in FIG. 1 is designed to produce, by weaving and by winding, superimposed layers of longitudinal and circumferential threads on a mandrel 12 bearing rows of barbs 14 defining longitudinal and circumferential corridors.

Before the mandrel 12 is mounted on the machine 10, the barbs may be made on the mandrel directly by machining the mandrel. However, for reasons already given, they are preferably implanted by pressure.

The implantation of the barbs by pressure can be done, for example, by means of a machine such as the one which is described in French Pat. No. 2 408 676. For the conditions relating to implantation and the particular structure of the machine, it will be helpful to refer to the text of the said patent. Here we shall simply mention that the barbs are preferably implanted in a direction radial with respect to the axis of the mandrel, but that they can also be inclined with respect to that direction. Furthermore, the barbs are generally composed of threads having a specific length and diameter that have been rigidified by means of previous impregnation with a thermosetting resin. In addition, the material constituting the mandrel is selected so as both to make possible the direct implantation of the barbs by simple pressing and the maintenance of these barbs once they have been implanted. This material must also withstand subsequent heat treatments, have a sufficiently rigid and undeformable texture in order to hold the three-dimensional body that surrounds it, and be able to be destroyed easily after the polymerization of the whole assembly. Thus use will preferably be made of a rigid foam such as a foam made from polyurethane or a phenol foam.

The mandrel 12 provided with barbs 14 is characterized in that the barbs are arranged in the form of longitudinal and circumferential rows which between them define longitudinal corridors (no reference number) and circumferential corridors 17. The circumferential corridors can be made up either of juxtaposed parallel corridors or of a single helicoidal corridor, depending upon the arrangement of the barbs.

As can be seen in FIG. 1, the machine 10 comprises a frame or chassis 16 bearing at its extremities left 18 and right 20 consoles which project upward from the frame 16. The console 18 and 20 support a horizontal shaft 22 on which the mandrel 12 is mounted. The shaft 22 is rotated by means (not illustrated) consisting, for example, of an electric motor connected to the shaft 22 by a transmission system such as a system of pulleys and belts. The rotation of the shaft 22 and the mandrel 12 must take place discontinuously and in specific steps corresponding to the distance separating the longitudinal corridors formed between the barbs 14. For this purpose, the electric motor which drives the shaft 22 is preferably controlled by a standard-type switching system (not illustrated) which takes care of the operation of the entire machine assembly.

The consoles 18 and 20 also support one or more horizontal transverse members 24 which are parallel to the center-line of the shaft 22, on which members a winding sub-assembly 26 moves. The sub-assembly 26 comprises one or more thread feeding spools, a heddle placing the thread or threads in the winding corridors 17 formed on the mandrel 12 and tension devices for these threads (not illustrated). The displacement of the winding sub-assembly along the transverse member 24 can be controlled by any known means, and notably by means of a worm having an appropriate pitch.

Each of the consoles 18 and 20 supports at its top a vertical column 28, 30, respectively. The columns 28 and 30 are connected at their tops by a beam 32 and they support a cross member 34 which is horizontal and parallel to the center-line of the shaft 22. The cross member 34 supports a weaving sub-assembly 36 as well as a holding device or sub-assembly 38 for holding one extremity of certain of the weft threads that do not extend over the entire length of the mandrel 12. This device is shown in larger scale in FIGS. 2 and 3. The columns 28 and 30 also support a rail 40 positioned between the cross member 34 and the beam 32 and extending parallel to the uppermost generatrix of the mandrel 12 located in the vertical plane which passes through its center-line.

The weaving sub-assembly 36 comprises a guiding system 41 which follows the rail 40. This guide system 41 is connected in a rigid manner to a weaving heddle 42. The weaving sub-assembly 36 is fed with threads from one or more reels (not illustrated) through a tension system 43 supported by the beam 32. It has imparted to it a to-and-fro movement along the cross member 34 controlled by any known means such as, for example, an electric motor (not illustrated) alternately moving a belt or chain 44 in either direction about two pulleys or gear systems (not illustrated) located at each of the extremities of the cross member 34. The heddle 42 is arranged in such a way that the displacement of the weaving sub-assembly 36 along the cross member 34 controls the displacement of the heddle in the uppermost weaving corridor located in the vertical plane passing through the center-line of the mandrel 12.

In order better to understand the structure and the operation of the winding sub-assembly 26 and the weaving sub-assembly 36 of the machine 10, it will be usefull to refer to the text of French Pat. No. 2 315 562, which gives a detailed description of a specific manner of embodiment of a winding and weaving machine comparable to the machine of this invention. Let us recall that the process for the manufacture of a three-dimensional part described in this French patent is distinguished from the process in accordance with this invention by the fact that winding and woofing are done on a mandrel that is not provided with barbs, the layers of threads thus constituted being subsequently sewn by means of an appropriate device. Furthermore, no system comparable to the holding sub-assemblies 38 in described in the said patent.

When manufacturing a rotational part having a variable diameter such as a part comprising truncated-cone-shaped portions as illustrated in FIG. 1, it is necessary to cause the number of woof threads contained in each of the longitudinal corridors and the number of winding threads contained in each of the circumferential corridors to vary from one extremity of the part to the other if one wishes to maintain an appreciably uniform thread density over the entire length of the part. In certain special applications, and regardless of the shape of the part produced, it may, on the contrary, be necessary to cause the thread density to vary in accordance with a given law within the part to be manufactured. In this case, it is also necessary to position certain weft threads in only one part of the longitudinal corridors defined on the mandrel 12 between the barbs 14 and to cause the number of winding threads contained in each of the circumferential corridors 17 to vary from one extremity of the mandrel to the other.

In accordance with the invention, parts of this type can automatically be mass-produced regardless of their shape and regardless of the law of variation of the thread density from one end of the part to the other if one places one or more holding devices of the same type as device 38 in the appropriate locations. This device 38 will now be described in detail, with reference being made to FIGS. 2 and 3.

Figure 2:
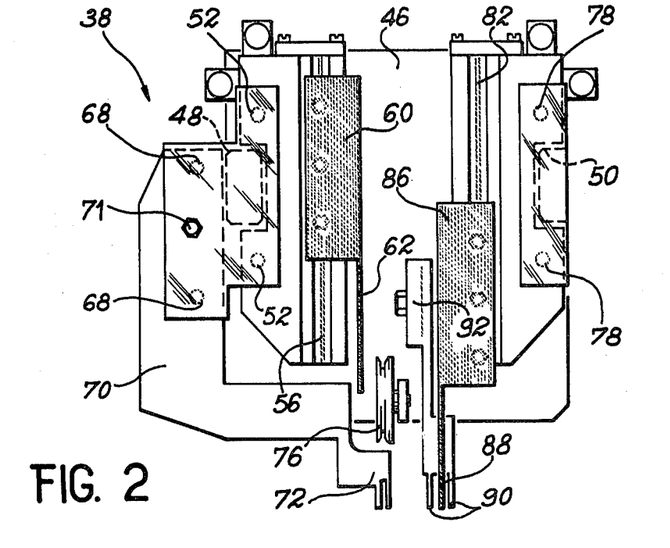
FIG. 2 is a front view in larger scale, illustrating the system designed for holding one extremity of the weft threads by means of a holding thread whenever such weft threads do not extend over the entire length of the longitudinal corridors.
Figure 3:
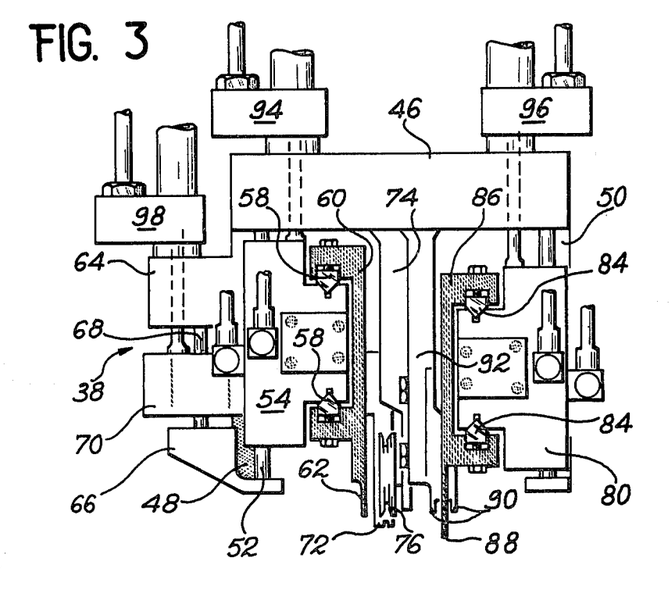

As illustrated by there figures, the holding device 38 comprises a frame 46 mounted in a fixed manner at the desired location on the cross member 24, for example by means of bolts (not shown). More precisely, the device 38 is mounted at the level of the extremities of certain of the weft threads that do not extend out of the longitudinal corridors defined between the barbs 14. The frame 46 supports four horizontal arms 48, 74, 92 and 50 positioned in that order as one moves away from the extremity of the weft thread to be held. These arms project forward above the mandrel 12.

Two horizontal columns 52 are positioned in the same vertical plane on either side of the arm 48 in order to support a jack body 54 in a sliding arrangement. The movement of the jack body 54 along the columns 52 is controlled by a screw jack 94 supported by the frame 46. The jack body 54 is provided with two opposite vertical V-shaped guide bars 54 which accomodate slides 58 fastened in an adjustable manner to a sub-assembly 60 bearing a first retractable holding member 62. The movement of the sub-assembly 60 along the guide bars 56 is controlled by a screw jack placed in the body 54. The member 62 is constituted by a vertical plate positioned in a radial plane with respect to the mandrel and extending downward over the mandrel 12 in order to enter a circumferential corridor when drawn downward by the jack 54 and when the latter is pulled forward by the jack 94.

As illustrated by FIGS. 2 and 3, each extremity of the arm 48 is prolonged by an overhanging portion 64, 66 which extends essentially horizontally away from arm 50. The overhanging portions 64, 66 support two columns 68 on which a support 70 is accomodated in a sliding arrangement. The support 70 extends vertically downward, and forms an elbow defining a substantially horizontal portion positioned above the arm 48 and supporting with its free end a thread guide 72. The thread guide is situated in the immediate proximity of the plate 62 and is slightly recessed with respect to it if one considers the extremity of the weft thread held by the device 38. The movement of the support 70 along the columns 68 is controlled by a screw jack 98 supported by the overhanging portion 64. The arm 74 bears at its extremity a winding thread-guide wheel 76 positioned above the thread guide 72 and slightly recessed with respect to it. As we shall see further on, a holding thread 100 (FIG. 4) coming from a spool (not illustrated) is fed into the groove of the wheel 76 and passes through the thread guide 72.

As for the arm 48, two horizontal columns 78 are arranged in the same vertical plan on either side of the arm 50. A jack body 80 is mounted in a sliding arrangement on the columns 78 along which it can move due to the action of a screw jack 98 supported by the frame 46. The body 80 has two opposite vertical V-shaped guide bars 82 which accomodate slides 84 in an adjustable arrangement with a sub-assembly 86 which supports a second retractable holding member 88. The movement of the sub-assembly 86 along the guide bars 82 is controlled by a screw jack placed in the body 80. The member 88 consists of a vertical plate positioned in a radial plane with respect to the mandrel 12 and extending downward above the latter. As in the case of the plate 62, the width of the plate 88 is sufficiently small in order to make it possible for it to enter one of the circumferential corridors 17 defined between the barbs 14 when it is moved down by the screw jack 80 and when the latter is caused to move towards the front by the screw jack 96. As shown in FIGS. 2 and 3, the plate 88 is placed in a recessed position with respect to the thread guide 72 if one considers the extremity of the weft thread held by the device 38. The plate 88 is accomodated in a sliding arrangement between two retaining forks 90 mounted at the extremity of the arm 92.

By virtue of the structure which has just been described for the holding device 38, the two holding members 62 and 88, the thread guide 72 and the fixed plates 90 are arranged above the mandrel 12 in the proximity of the vertical plane passing through its center-line. Furthermore, the holding members 62 and 88 are capable of moving both radially away from the mandrel 12 and tangentially back from the vertical plane passing through the center-line of the mandrel, while the thread guide 72 can move tangentially with respect to the mandrel and the wheel 76 and the plates 92 are stationary.

Figure 4A:
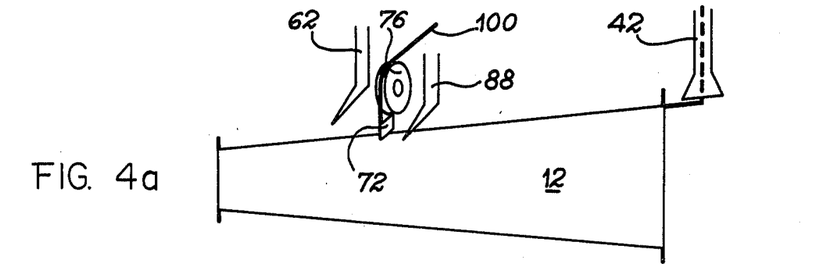
Figure 4B:
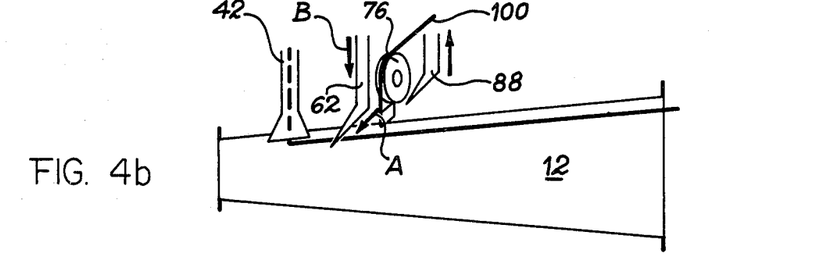

When a layer of longitudinal threads is made on the mandrel 12, the operation of the machine 10 is as follows:

Before the beginning of woofing, the mandrel 12 is positioned with precision with respect to the different components of the machine 10, in such a way that a longitudinal weaving (woofing) corridor is located in the vertical plane passing through the center-line of the mandrel. The thread guide 72 is then positioned in such a way that it is situated astride a row of barbs 14 and the retaining forks 90 are placed in the circumferential corridors. When the heddle 42 is not yet in position in the uppermost weaving corridor, as illustrated by FIGS. 1 and 4a, the plate 62 is in the raised position and drawn back with respect to the vertical plane passing through the center-line of the mandrel and the plate 88 is in the lowered position and drawn back with respect to the said vertical plane, in such a way as to hold the extremities of the woof threads which have just been positioned in the neighbouring corridors by the heddle.

Woofing is effected by moving the sub-assembly 36 along the cross member 34 alternately from left to right and from right to left due to the action of an electric motor (not illustrated) and a driving system such as the belt or chain 44. Whenever the weft thread is not supposed to extend over the entire length of the longitudinal corridors formed between the barbs 14 on the mandrel 12, a means of limiting the stroke such as an electro-magnetic contact is placed on the track of the sub-assembly 36 in order to halt its movement towards the left, if one considers FIG. 1, when the heddle 42 which is moving in the uppermost longitudinal corridor has reached a point slightly beyond the holding member 62 of the device 38.

As soon as the sub-assembly 36 has come into contact with the stroke limiting switch contact, the holding member 62 advances tangentially to the mandrel 12 due to the action of the jack 94 (arrow A in FIG. 4b) and becomes lowered into one of the circumferential corridors 17 due to the action of the jack 54 (arrow B in FIG. 4b) so as to hold the weft thread that has just been placed in position by the heddle 42. The second holding member 88 then rises due to the action of the jack 80 in order to free the weft threads previously placed in position in the neighbouring corridors and now held in place by the retaining forks 90, by the member 62 and by the thread 100 deposited by the thread guide 72.

Figure 4C:
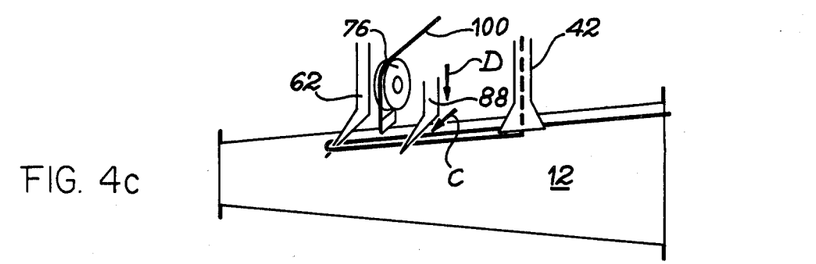
Figure 4D:
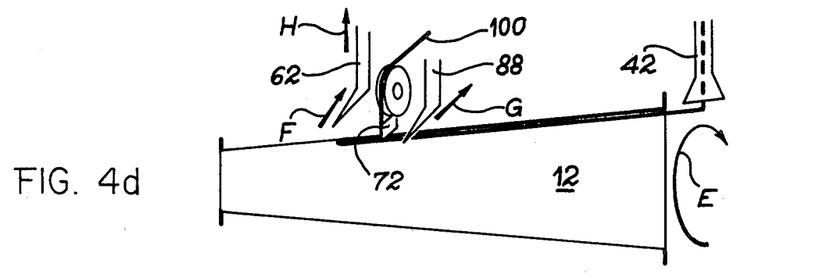

The heddle 42 then begins to come back towards the right if one considers FIGS. 1 and 4, in such a way that the return weft thread passes over the foot of the holding member 62 as illustrated schematically in FIG. 4c. Preferably, but without limitation, the heddle 42 stops shortly after it has gone beyond the holding device 38. The second holding member 88 then moves forward, tangentially to the mandrel 12, due to the action of the jack 96 (arrow C in FIG. 4c) in order to come into position above the to-and-fro woof threads that have just been placed by the heddle 42 and it descends due to the action of the jack 80 (arrow D in FIG. 4c) in order to hold these threads. The different members of the device 38 are then located in the positions shown in FIG. 4c.

The heddle 42 then resumes its movement towards the right within the uppermost woofing corridor until it reaches a point beyond the extremity of the mandrel 12, in the position illustrated in FIG. 1. At this point in time, due to the drive of the electric motor (not illustrated), the mandrel pivots with the shaft 22 (arrow E in FIG. 4d) through an angle such that the heddle 42 is located opposite the weaving corridor adjacent to the corridor in which it has just deposited a thread. Simultaneously with this rotational movement of the mandrel 12, the holding members 62 and 88 move backward tangentially to the mandrel (arrows F and G in FIG. 4d) due to the action of the jacks 94 and 96. This simultaneous movement of the mandrel 12 and the members 62 and 88 which are in contact with the threads positioned by the heddle has the effect of reducing friction and preventing any breaking of the threads. The rotational movement of the mandrel 12 also has a consequence that it unwinds the holding thread 100, which passes into the groove in the wheel 76 and through the thread guide 72 by a length corresponding to the distance between two juxtaposed weaving corridors. Finally, the first holding member 62 rises due to the action of the jack 54 (arrow H in FIG. 4d) in such a way that it completely frees the extremity of the weft thread that has just been put into position by the heddle 42. This weft thread is then entirely held in place by the second member 88, while the neighbouring threads are held in place both by the holding forks 90 and by the thread 100 which passes over the wheel 76 and over the thread guide 72. Another weaving cycle exactly the same as the one which has just been described can then begin.

It will be noted that the relative arrangement of the thread guide 72 and the members 62 and 88 is such that the weft threads put into position by the heddle 42 in the longitudinal corridors begin to be held by the thread 100 as soon as the mandrel 12 has turned through an angle corresponding to the distance separating two consecutive longitudinal corridors.

When a new layer of longitudinal threads begins to be produced by means of the weaving sub-assembly 36, the free end of the thread 100 is attached to the mandrel 12 by any suitable means, as for example by being hooked to one of the barbs 14. The simultaneous operation of the weaving sub-assembly 36 and the holding system 38 thus takes place in a continuous manner until all the woofing corridors have been provided with one or more threads by means of the heddle 42. At this point, the thread 100 is cut and its second extremity can also be fastened to one of the barbs 14 in order definitively to hold in place the layer of weft threads thus formed. It should be noted that the synchronized control of the different parts of the machine in accordance with the invention can be effected by means of an electronic system controlled by judiciously positioned switches. Such a system is not part of the invention and will not be described in detail here.

A layer of circumferential threads can then be produced by means of the winding sub-assembly 26 in a manner comparable to that which is described in French Pat. No. 2,315,562. In accordance with a secondary characteristic of the invention, and in order that it may be possible to cause the number of winding threads to vary in the same manner as the number of woof threads from one extremity of the part to be produced to the other, the winding sub-assembly 26 preferably comprises several thread spools (not illustrated), in such a way that the number of winding threads put into position by the heddle of the sub-assembly 26 in the circumferential corridors 17 can be modulated through the connection of a greater of lesser number of such thread spools to the winding heddle according to the position of the sub-assembly 26 with respect to the mandrel 12. The number of threads positioned in each of the corridors 17 can thus be modulated as needed from one extremity of the mandrel 12 to the other; this makes it possible to produce either a rotational part having a non-uniform diameter with a virtually constant density of winding threads, or, on the contrary, a part having any shape whatsoever with a density of winding threads that varies in accordance with a given law.

In accordance with another secondary feature of the invention, the number of barbs 14 implanted on the mandrel 12 can likewise vary from one extremity of the mandrel to the other, either for the purpose of providing an appreciably constant density of threads for a part having a diameter that is not uniform, or on the contrary for the purpose of causing the thread density of vary over the entire length of the mandrel. In this case, the widths of the longitudinal corridors defined between the barbs 14 exhibit breaks in continuity. With a view to ensuring the most accurate possible centering of the woofing heddle 42 with respect to such longitudinal corridors, it is necessary in this case to shift the heddle 42 slightly in a lateral direction with respect to the vertical plane passing through the center-line of the mandrel at least at the points where certain of such breaks in continuity take place. For this purpose, the heddle 42 can be mounted on appropriate means such as a parallelogram-type system situated in a substantially horizontal plane and having its deformation controlled by a cam mounted on the cross member 34.

Numerous superimposed layers of longitudinal and circumferential threads can also be placed about the mandrel 12 for the purpose of producing a part having the desired thickness.

In a known manner, once the desired number of layers has been produced on the machine 10, the mandrel 12 covered with these various layers of threads is unmounted and the whole assembly undergoes one or more impregnations with a thermosetting resin, such as epoxy or phenol resin, and then polymerization of such resin. The mandrel is then eliminated, generally by machining with a cutter or a grinding wheel along its center line, in such a way as to leave only the hollow body made of densifying three-dimensional material.

Preferably, the circumferential and longitudinal thread or threads placed on the mandrel 12 by the winding heddle (not illustrated) and by the woofing heddle 42 are constituted by threads, filaments, fibers or strands made of graphite, carbon, silica or glass. The threads in the three directions can be of the same nature or of different natures depending upon the characteristics of the manufactured part. In the process according to the invention, such threads may to advantage be impregnated with thermosetting resin, as this considerably improves the distribution of the resin in the core of the formed part.

It appears clearly in the light of the foregoing description that the invention applies more particularly to the production of hollow rotational pieces made of three-dimensional fabric in which the thread density from one end of the part to the other can be perfectly controlled regardless of the shape of the generatrix of the part. As we have seen, the invention applies to any body manufactured by winding and by woofing on a mandrel provided with barbs, regardless of the process used for the purpose of producing the barbs.

What is claimed is:

1. A process for the manufacture of rotational parts from a three-dimensional material comprising the steps of producing a supporting mandrel provided with longitudinal and circumferential rows of barbs which between them define longitudinal corridors and circumferential corridors, placing superimposed layers of longitudinal threads and of circumferential threads mounting the longitudinal threads continuously along the contour of the mandrel, in the said corridors, some of the longitudinal threads being placed in only a portion of length of the corresponding longitudinal corridors, and having extremities which do not extend out of the corresponding longitudinal corridors, maintaining said extremities continuously following their application to said mandrel by winding at least one holding thread in at least one circumferential corridor next to said extremities, simultaneously to the placing of the corresponding layer of longitudinal threads, said extremities of at least some of the longitudinal threads being temporarily maintained by means of a first retractable member before the holding thread is wound on, densifying the assembly thus obtained, and finally eliminating the supporting mandrel, whereby said rows of barbs and said sheets of threads define the three-dimensional material.

2. A process in accordance with claim 1 wherein the number of circumferential threads of a given layer is caused to vary according to the circumferential corridors in which they are placed.

3. A process in accordance with claim 1 wherein the longitudinal and circumferential threads are directly placed in the corresponding corridors.

4. A process in accordance with claim 3, wherein some of the longitudinal rows of barbs do not extend over an entire length of the mandrel and define breaks in continuity in widths of the longitudinal corridors, the longitudinal threads being put into place by being moved circumferentially with respect to said mandrel in the proximity of at least some of said breaks in continuity, in such a way as to center said longitudinal threads with respect to the corresponding longitudinal corridors.

5. A process for the manufacture of rotational parts from a three-dimensional material comprising the steps of producing a supporting mandrel provided with longitudinal and circumferential rows of barbs which between them define longitudinal corridors and circumferential corridors, placing superimposed layers of longitudinal threads and of circumferential threads in the said corridors, densifying the assembly thus obtained, then eliminating the supporting mandrel, placing some of the longitudinal threads in only a portion of the length of the corresponding longitudinal corridors, extremities of said some longitudinal threads being temporarily held in position by a first retractable member, said some longitudinal threads being then caused to come back into the corresponding longitudinal corridors over said first retractable member, said extremities being then held in position inwards of the first retractable member by a second retractable member, said first retractable member being then withdrawn in a direction that is substantially tangential with respect to the mandrel, and at least one holding wire being wound on in at least one circumferential corridor next to said extremities, thereby continuously holding said extremities in position.

6. A process in accordance with claim 5, including the step of rotating said mandrel by an angle corresponding to the distance separating two successive longitudinal corridors at the same time that the withdrawal of said first retractable member takes place, said second retractable member moving tangentially in the same direction and over a substantially equal distance.

7. A process in accordance with claim 5 or claim 6, including the step of varying the number of circumferential threads of a given layer according to the circumferential corridors in which they are placed.

8. A process in accordance with claim 5 or claim 6, including the step of placing the longitudinal and circumferential threads directly in the corresponding corridors.

9. A process in accordance with claim 8, wherein some of the longitudinal rows of barbs do not extend over an entire length of the mandrel and define breaks in continuity in widths of the longitudinal corridors, the longitudinal threads being put into place by being moved circumferentially with respect to said mandrel in the proximity of at least some of said breaks in continuity, in such a way as to center said longitudinal threads with respect to the corresponding longitudinal corridors.

10. A machine for the manufacture of rotational parts in a three-dimensional material comprising means for supporting, in a rotating arrangement, a mandrel provided with rows of barbs defining between themselves longitudinal corridors and circumferential corridors, means to lay down longitudinal threads and means to lay down circumferential threads, said means depositing superimposed layers of threads in the said corridors, wherein said machine additionally comprises at least a first retractable member to hold in place one extremity of a longitudinal thread when the latter does not extend outside of the corresponding corridor and a winding system which positions at least one holding thread in at least one of the circumferential corridors adjacent to said extremity of the longitudinal thread to continuously hold in place the corresponding extremities of the longitudinal threads previously put into position in the other longitudinal corridors by said means to lay down longitudinal threads.

11. A machine in accordance with claim 10, wherein a second retractable member is situated in a recessed position with respect to said first retractable member, considering the said extremity of the longitudinal thread.

12. A machine in accordance with claim 11, wherein said means to lay down the longitudinal threads comprise at least a heddle guided to move along a generatrix of the mandrel within a longitudinal corridor, means for causing the mandrel to rotate in a given direction and in a discontinuous manner in steps, each step being equal to the distance between two successive longitudinal corridors each time that the heddle arrives at either extremity of the mandrel, each of said retractable members being movable radially with respect to the mandrel for the heddle to pass and being movable tangentially to accompany the mandrel in its rotation and to free said first retractable member from the longitudinal thread.

13. A machine in accordance with claim 12, wherein said winding system comprises a thread feeding system and a thread guide system tangentially recessed with respect to the longitudinal corridor in which said heddle is moving and in a circumferential corridor located between those in which said retractable members are accommodated.

14. A machine in accordance with claim 13, including a support assembly associated with a fixed part of the machine including for said thread guide system said support assembly holding said retractable members and means for moving said retractable members radially and tangentially with respect to said mandrel.

* * * * *